Dec. 23, 1952 J. P. KOVACS 2,622,738
SELF-SUPPORTING METALLIC EDGE TYPE FILTER UNIT
Filed Oct. 31, 1947 2 SHEETS—SHEET 1

INVENTOR.
Julius P. Kovacs
BY
Kenyon & Kenyon
ATTORNEYS

Dec. 23, 1952 J. P. KOVACS 2,622,738
SELF-SUPPORTING METALLIC EDGE TYPE FILTER UNIT
Filed Oct. 31, 1947 2 SHEETS—SHEET 2

INVENTOR.
Julius P. Kovacs
BY
Kenyon & Kenyon
ATTORNEYS

Patented Dec. 23, 1952

2,622,738

UNITED STATES PATENT OFFICE 2,622,738

SELF-SUPPORTING METALLIC EDGE TYPE FILTER UNIT

Julius P. Kovacs, Newark, N. J., assignor to Purolator Products, Inc., Newark, N. J., a corporation of Delaware Application October 31, 1947, Serial No. 783,247

5 Claims. (Cl. 210—164)

This invention relates to improvements in filters.

A principal object of this invention is to provide a metal edge type filter that is self-supporting and does not require a supporting frame.

A further object of the invention is to provide an inexpensive metallic filter unit of rigid construction capable of withstanding relatively high or low pressures and having a large area of definitely sized filtering interstices within small compass and requiring a minimum of metal in relation to effective filtering surface and with which the need for a supporting frame is eliminated.

Another object of this invention is to provide a novel process of producing such filters rapidly, efficiently and inexpensively.

A filter unit embodying the invention consists of a slotted metal cylinder composed of a helix of metal ribbon of minute thickness having its wide faces normal to the axis of the helix, and means to space the turns of the helix to provide filtering slots, spacing means preferably consisting of projections of predetermined height extending from one face of the ribbon. Preferably, the ribbon is preformed with definite uniform curvature, whereby without any deforming or straining, it naturally assumes helical shape with its wide faces transverse to the axis of the helix and with the turns of the helix spaced apart at a known distance by the said projections. The turns of the ribbon are definitely spaced to provide a succession of apertures or slots which are of uniform predetermined gauge or filtering width, exactly corresponding to the height of the projections and which may be so extremely narrow as to make the filter unit effective to remove from fluid passing through it all but the most minute particles. Due to the extreme thinness of the ribbon, the total area of the apertures or slots, i. e. the effective filtering area, forms a much larger proportion of the total area of the filter element than in previously known filters of rigid construction and therefore fluid to be filtered may be passed through the filter unit at a relatively high rate.

Although the metal ribbon is uniformly curved or shaped so that it may easily be wound on edge in the form of a helix without any deforming or straining and will invariably tend to maintain its helical shape except for a tendency to bend due to its thin section, the tendency of the coils to slide sideways eccentrically from its major axis and their tendency to open up as would a too light spring upon the application of an elongating force must be eliminated.

The manner of preforming the ribbon, is described, for example, in Liddell Patent No. 2,042,537, granted June 2, 1936.

After formation of the ribbon as therein described, the ribbon is coated with a fusible metal coating such as copper as by electroplating, or in other suitable way with copper or other fusible metal. Thereafter, preferably, the coated ribbon is temporarily wound on edge around a drum or other hollow support, of heat resisting material to which the fusible coating will not bond when fused by heat treatment. This drum or other support aligns the turns of the ribbon and they are pressed against each other by appropriate end supports or clamps so that the raised spacing bumps are in intimate contact with adjacent faces of other turns of the ribbon. In the alternative, electroplating could be eliminated, and instead iron, steel, Monel metal or other metallic wire could be copper coated prior to its formation into ribbon form. In either event, after application of the ribbons to the temporary drum supports, the so-mounted ribbons are inserted into a brazing oven and raised to a temperature therein of between 2040 and 2080° F. in an atmosphere of hydrogen to fuse the raised spacers of the ribbon to the adjacent faces of the ribbon with which they are in contact. As an alternative for such brazing, the raised spaces could be resistance welded or projection welded or otherwise permanently bonded to the adjacent faces. The brazing procedure is preferable.

Thereafter, the drum supports are removed from the coils. The filter element resulting is tubular in shape, is entirely self-supporting eliminating thereby the need for any internal supporting structure and with which as a result of such elimination, all the effective filtering area is available. In other words, none of such filtering area is restricted or shut off by supporting structure as in the case of filter elements whose turns are not bonded together and which therefore require supporting structures.

With unbonded turns if because of excessive pressure, one turn should snap, the entire winding would have a tendency to uncoil and come apart thereby destroying its utility. When the turns are bonded, at the spacers, such uncoiling becomes impossible.

A ribbon of definite curvature may be obtained from a straight round wire according to the Liddell patent by passing the wire between cooperating conical rollers, one of the rollers having provision for forming the spacing projections or transverse ribs. The rollers not only convert the round wire into a thin flat ribbon, but give to it the definite predetermined curvature and shape which causes the ribbon to tend to assume the form of a helix with its wide faces in abutting relationship. Preferably, the ribbon is supplied to a drum or mandrel of heat resisting material which is rotated and moves axially as the ribbon is wound thereon and the operation is continued until a slotted cylinder of the desired size has been formed on the drum. The cylinder may then be fixed temporarily on the drum in any suitable manner or may be transferred to and fixed on another support temporarily and the spacers brazed or otherwise bonded to faces of adjacent turns of the helix. The slotted cylinder is thereafter removed from the support and is entirely self-supporting and constitutes a sturdy serviceable and highly efficient metallic filter unit.

Other objects, novel features and advantages of the invention will be apparent from the following specification and accompanying drawing, wherein.

Figure 7:
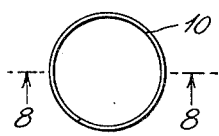
Fig. 7 is a top plan view of the filter of Fig. 6.
Figure 6:
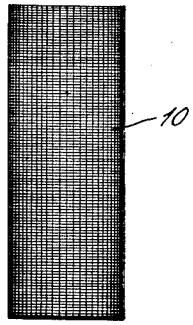
Fig. 6 is an elevational view on an enlarged scale of the novel filter embodying the invention.
Figure 8:
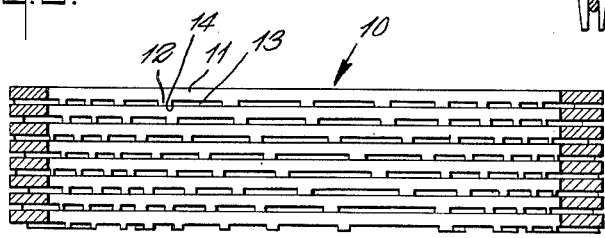
Fig. 8 is a sectional view on an enlarged scale taken along line 8—8 of Fig. 7 and viewed in the direction of the arrows.

Referring now to the illustrated forms of the invention shown more specifically in Figs. 6 to 8 inclusive, the filter unit comprises a slotted cylinder 10, formed from a flat metal ribbon 11 of minute thickness and which is provided on one face with spaced transverse ribs 12 which extend a similar distance outwardly from said face of the ribbon, which distance is suited to the purpose for which the filter is to be used, so that the resulting apertures or slots 13 are definitely sized to permit the desired flow and remove all particles of greater dimension than the height of the ribs. Instead of having ribs extending all the way across one face of the ribbon, projections or spacing means of uniform height may, of course, be substituted. If desired, the ribbon 11 could have the tapering cross section described in said Liddell patent and the ribs 12 could have corresponding shape. In all events, the ribs or spaces 12 are permanently bonded at 14 as by brazing or the like to the adjacent faces of the helix formed by ribbon 11.

In the case of filters for lubricating oil of an internal combustion engine, the ribs 12 preferably should be upwards of one thousandth of an inch in height and not more than three thousandths, in order to remove the harmful abrasives and still allow the substantially clean oil to flow through the filter unit at such rate that the filter will be of practical utility. In other instances the range of heights of the ribs may lie between .0005 inch to .030 inch.

The dimensions of the ribbon are such as to provide a cylinder having strength to withstand the pressure and the service to which it is to be subjected. For illustration, where the ribs are from one to two thousandths of an inch high and the filter is to be subjected to pressures not to exceed one hundred pounds per square inch, I have found that a metal ribbon may be used having an average thickness of six thousandths (.006) of an inch in a direction parallel to the axis of the cylinder or helix and a width thirty-five thousandths (.035) inch in the direction radially of the cylinder.

It is impossible to closely wind a straight ribbon of these dimensions on edge in helical form without such buckling or bending of the ribbon as to interfere with and prevent uniform spacing between the turns. Therefore, in prior metal filters it has been thought necessary, for purposes of uniform winding and construction, to make the thickness and size of the ribbon so great as to prevent buckling or tipping of the successive turns; and this width of ribbon, which has heretofore been considered a manufacturing requisite, so reduces the ratio of effective filtering area to total size of filtering element as to seriously impair the utility of the completed device. This defect is avoided by forming a very thin ribbon but preshaping it with definite uniform curvature so that it naturally tends to assume helical shape with its faces in contact and transverse to the axis of the helix.

Furthermore, a cylinder having the large ratio of effective filtering area to total area of filtering element contemplated by my invention will be at least one hundred times in diameter the thickness of the ribbon (in direction parallel to the axis of the cylinder) and in such arrangement the ribbon bonded at the ribs 12 has sufficient rigidity to hold the successive turns of the helix in alignment without the aid of any aligning or supporting means.

A metallic filter element 10 embodying the invention may be utilized in various types of automotive filter structures. For example, in the structure shown in Figs. 1 and 2, the hollow casing 20 is provided with the casing head 21. A sealing gasket 22, provides an effective seal at the joint between the head 21 and casing 20. An inlet passage 23 serves to admit oil or other fluid to be filtered to the casing 20. An outlet passageway 24 permits the filtered liquid to flow out of the casing. The metallic filter unit 10 is secured in place in the axial direction of casing 20 by an axially extending mounting bolt or member 25 which is headed at one end 26 to engage a cap 27, and threaded at 28 to screw into the head 21. The cap 27 fits over one end of the filter unit 10 and the other end of the latter abuts the head 21 about the outlet 24. The oil or other liquid to be filtered flows to casing 20 through inlet 23, downwardly in the latter, laterally through the interstices 13 of the filter unit, and upwardly to outlet passageway 24 as denoted by the arrows in Fig. 2. Dirt is collected on the outer surface of filter unit 10. The united head 21 and casing 20 bearing the filter unit 10 are supported by a case retaining yoke 30 which serves to hold the head and casing 20 in joined condition. These parts may be readily separated for inspection and cleansing or replacement of the filter unit 10.

Figure 2:
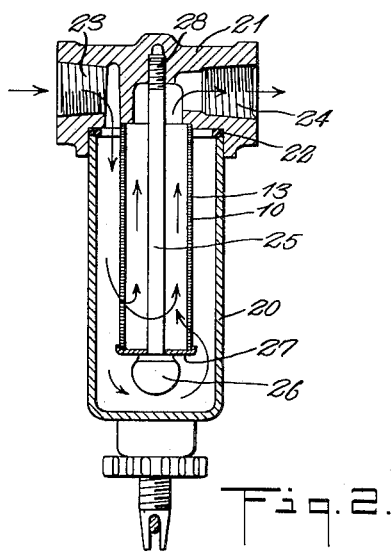
Fig. 2 is a sectional view taken along line 2—2 of Fig. 1 and viewed in the direction of the arrows.
Figure 3:
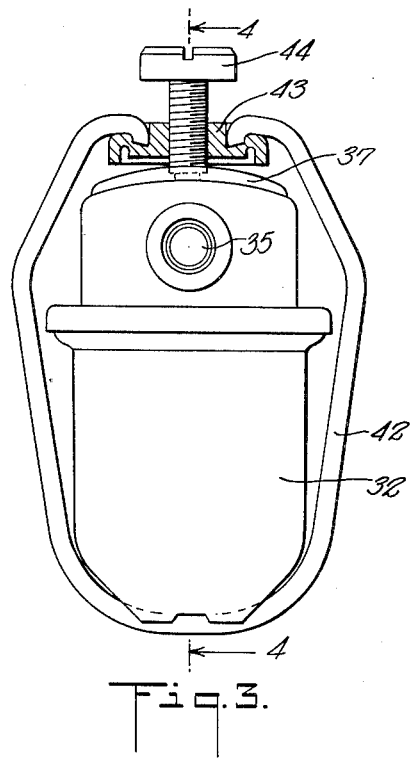
Fig. 3 is an elevational view, partially in section of a second form of unit embodying the invention.
Figure 4:
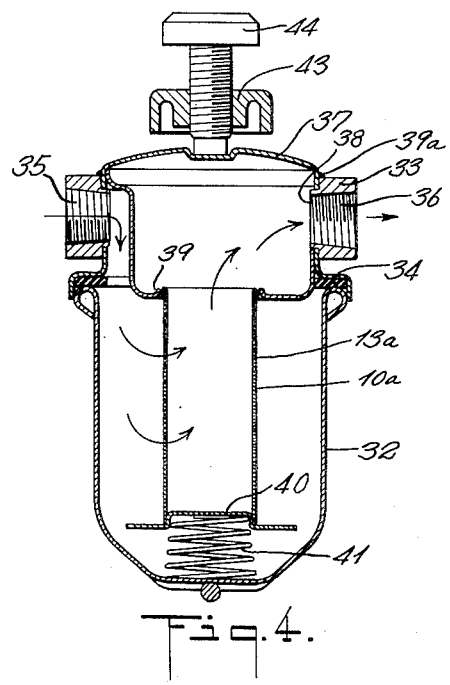
Fig. 4 is a sectional view taken along line 4—4 of Fig. 3 and viewed in the direction of the arrows.

In Figs. 3 and 4 a hollow casing 32 is provided with a casing head 33. A sealing gasket 34 provides an effective seal at the joint between head 33 and casing 32. An inlet passageway 35 serves to admit oil or other fluid to be filtered to the casing 32. An outlet passageway 36 permits egress of the filtered fluid. A hollow sealing cup 37 having an outlet opening 38 registering with outlet 36 and an inlet opening 39 is positioned within the head 33 and permanently secured in place as by soldering or welding at 39a (Fig. 4). The filtering unit 10a substantially identical in construction with unit 10 of Fig. 2 is removably positioned within the casing 32 and extends in the axial direction thereof. One end of the unit 10a fits tightly within the opening 39 of auxiliary casing 37. A reentrant cap 40 is fitted in the opposite end of unit 10a and a compression spring 41 lies between this cap and the bottom of casing 32 to press the unit 10a against the rim of opening 39 and to maintain the unit 10a in its axial position. The assembled casing 32 and head 33 bearing the filter unit 10a mounted as described are maintained in joined condition by an external yoke 42 which is secured to a yoke retainer 43 which is provided with a tightening thumbscrew 44 to tighten the separable parts together.

The flow of oil or other liquid to be filtered is through passageway 35, downwardly into casing 32, laterally through the interstices 13a in filter element 10a, upwardly through opening 39 and out through outlet 36, as denoted by the arrows in Fig. 4. Dirt is collected on the outer surface of the filter element 10a.

Figure 5:
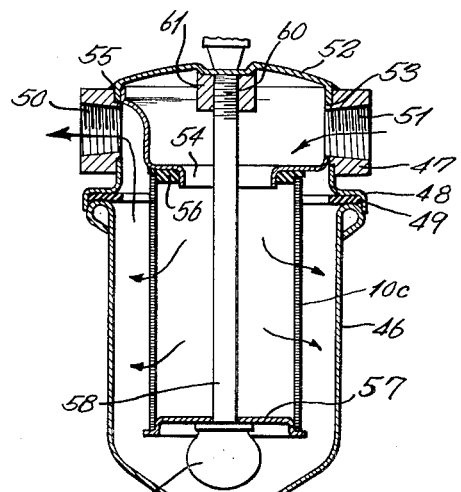
Fig. 5 is a sectional view similar to that of Fig. 4 of another modified form of the invention.

In the alternative, the direction of flow of oil or other liquid to be filtered may be reversed as shown by the arrows in Fig. 5. In such event the dirt is collected on the inner surface of the filter element 10a. In the assembly shown in Fig. 5 a hollow casing 46 is provided with a casing head 47. A sealing gasket 48 provides a seal at the joint 49 between the head 47 and casing 46. An outlet passageway 50 serves to permit egress of filtered oil or other liquid from casing 46. An inlet passageway 51 admits oil or other liquid to be filtered. A hollow sealing cap 52 having an inlet opening 53 registering with opening 51 and an outlet opening 54 is positioned within the head 47 and permanently secured in place as by soldering or welding at 55.

Figure 1:
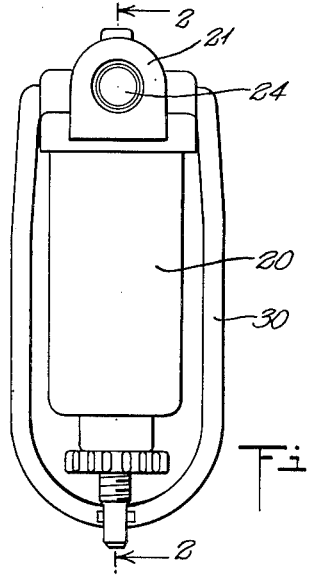
Fig. 1 is an elevational view of one form of unit embodying the invention.

The filtering unit 10c substantially identical in construction with unit 10 of Figs. 1 and 2 is removably positioned within the casing 46 and extends in the axial direction thereof. One end of the unit 10c abuts a gasket 56 that surrounds the outlet 54 of cap 52. A reentrant cap 57 is provided for the other end of filter unit 10c and a longitudinally extending tightening screw 58 headed at 59 and threaded at 60 to engage a nut 61 secured to the cap 52 serves to removably position the filter unit 10c as shown. The flow of oil or other liquid to be filtered is in the direction of the arrows shown in Fig. 5, or may be reversed. Dirt collects upon the inner surface of filter unit 10c if the flow direction is as shown or on its outer surface if the flow direction is reversed. The separable parts are held together in substantially the same way as similar parts of Figs. 3 and 4 so as to facilitate removal, cleansing and, if needed, the replacement of filter elements 10c.

Figure 9:
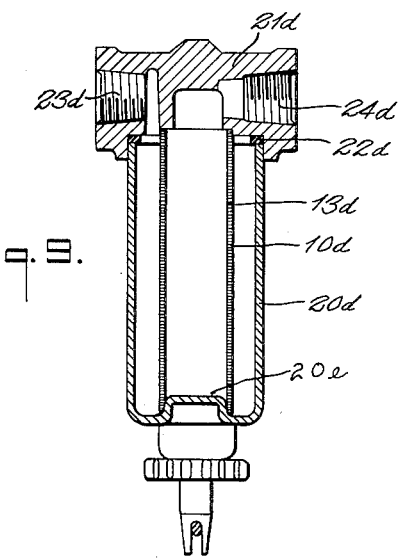
Fig. 9 is a view similar to Fig. 2 of another form of the invention.

In the assembly as shown in Fig. 9 which resembles closely that of Fig. 2, the material modification consists in elimination of the bolt 25 and the cap 27. Instead of this arrangement for supporting the filter unit 10d, the casing 20d is provided with a reentrant portion 20e admeasured in diameter to fit snugly within the lower end of the filter element 10d so as to center this end and support the element 10d. Other structural elements in this figure bearing reference numerals identical with those of Fig. 2 but with the subscript d are identical therewith and for the same purposes. The oil flow is substantially the same as that shown in Fig. 2 or may be in the reverse direction if desired.

The elimination of supporting structure for the filter elements 10a, 10b, 10c or 10d increases their effective filtering areas substantially. Moreover, the structure is simplified and costs of production are reduced.

While many modifications in form and arrangement may be made without departing from the spirit of the invention, it is apparent that the above described filtering units combine the well-known advantages of edge filtration with absolutely uniform predetermined width of the filtering apertures or slots so that rigid construction is effected and the aggregate area of the apertures or slots is large in relation to the total area of the unit and a very great saving in material is effected over other metal filters in relation to the filtering capacity provided.

It is also apparent that the filter elements 10 to 10e are far simpler to clean both internally and externally as compared with ordinary cylindrical screens wherein the fine mesh and fine spacing of the screen would be so fragile as to rupture very easily. The filter elements 10 to 10e are far stronger than such ordinary cylindrical screens, and are capable of being cleaned repeatedly inside and outside without damage notwithstanding the fine spacing between coils of the helices.

By the term "helix" as used in the foregoing description and in the appended claims, it is intended to include elements which are substantially cylindrical in form, such for example, as truncated cones and similar shapes.

What is claimed is:

1. A completely self-supporting filtering unit comprising a helix in tubular form composed of a single length of thin narrow metal ribbon helically wound into a plurality of turns with its width substantially normal to the axis of the helix, said ribbon lacking self-supporting stability when wound in helical form, and spacing members integral with the ribbon and extending from one of its wider faces and into engagement with the adjacent turns of the ribbon forming the helix, said spacing members being bonded permanently to the adjacent turns of the ribbon forming the helix with which they engage and thereby defining filtering interstices of definite dimensions between adjacent turns of the helix and, also, thereby providing a completely stable, self-supporting, integral, one-piece filtering unit.

2. A completely self-supporting filtering unit consisting of a single length of metallic ribbon normally lacking self-supporting stability when wound in helical form and having narrow edges and relatively wide faces, one of said wide faces being smooth and the other of said faces having integral spacing projections, said ribbon and its projections being coated with a fusible metallic coating and being wound into the form of a tubular helix with a multiplicity of turns and with the width of the ribbon lying substantially normal to the axis of the helix and with the projections in the one wide face of the ribbon in opposed relationship in the respective turns to a portion of the smooth wide face of the ribbon and permanently bonded thereto by fusion of contacting portions of the fusible metallic coating on the projections and on the smooth wide face and the remaining portions of the turns being free from bonding, thereby providing a completely stable, self-supporting, unitary, tubular filtering element of helically wound metallic ribbon having filtering interstices of determined size defined by the projections between successive turns of the helically wound ribbon.

3. A completely self-supporting tubular filtering unit consisting of a metallic ribbon of thin narrow metal normally lacking self-supporting stability when wound in helical form, said ribbon being wound into a tubular helix with a plurality of turns and with the width of the ribbon substantially normal to the axis of the helix, and said ribbon having spaced integral projections extending from one face thereof and being smooth on its opposite face, the projections of the ribbon being in contact with the adjacent smooth faces in the turns and permanently bonded thereto, and the remaining portions of the turns being free from bonding thereby providing a completely stable, self-supporting, unitary, tubular filtering unit with filtering interstices between adjacent turns defined by the projections.

4. In a filter device, the combination comprising a casing having a chamber and an inlet and an outlet both communicating with the chamber in the casing, a completely self-supporting filtering unit mounted in the chamber of the casing and interposed between the inlet and outlet of the casing to compel flow of fluid through said filtering unit in its passage through the casing from said inlet to said outlet, said filtering unit consisting of a single length of metallic ribbon normally lacking self-supporting stability when wound in helical form and having narrow edges and relatively wide faces, one of said wide faces being smooth and the other of said faces having integral spacing projections, said ribbon and its projections being coated with a fusible metallic coating and being wound into the form of a tubular helix with a multiplicity of turns and with the width of the ribbon lying substantially normal to the axis of the helix, and with the projections in the one wide face of the ribbon in opposed and contacting relationship in the respective turns with adjacent portions of the smooth wide face of the ribbon and being bonded thereto permanently by fusion of contacting portions of the fusible metallic coating on the contacting projections and the said adjacent portions of the smooth wide face and the remaining portions of the turns being free from bonding thereby providing a completely stable, self-supporting, unitary tubular filtering element of helically wound metallic ribbon having filtering interstices of determined size defined by the projections between adjacent turns of the helically wound ribbon.

5. In a filter device, the combination comprising a casing having a chamber and an inlet and outlet both communicating with the chamber, and a completely self-supporting filtering unit mounted in the chamber and interposed between said inlet and said outlet to compel flow of fluid through the filtering unit in its passage through the casing from said inlet to said outlet, said filtering unit consisting of a single length of metallic ribbon normally lacking self-supporting stability when wound in helical form and having narrow edges and relatively wide faces, one of said wide faces being smooth and the other of said faces having integral spacing ribs, said ribbon and its ribs being coated with a fusible coating, said ribbon being wound into the form of a tubular helix having a multiplicity of turns and with the width of the ribbon lying substantially normal to the axis of the helix and with the ribs in the one wide face of the ribbon in opposed and contacting relationship in the respective turns with adjacent portions of the smooth wide face of the ribbon and being bonded thereto permanently by fusion of the fusible coating wherever contact exists between ribs and smooth wide face portions of the ribbon and the remaining portions of the turns being free from bonding, thereby providing a completely stable, self-supporting unitary tubular filtering element of helically wound metallic ribbon having filtering interstices of determined size between adjacent turns of the ribbon defined by the ribs between said adjacent turns.

JULIUS P. KOVACS.

REFERENCES CITED

The following references are of record in the file of this patent:

UNITED STATES PATENTS

| Number | Name | Date |
| --- | --- | --- |
| 1,729,197 | Whann | Sept. 24, 1929 |
| 1,824,079 | Foley | Sept. 22, 1931 |
| 1,974,235 | Cammen | Sept. 18, 1934 |
| 2,042,537 | Liddell | June 2, 1936 |
| 2,133,004 | Williams et al. | Oct. 11, 1938 |
| 2,146,823 | Karmazin | Feb. 14, 1939 |
| 2,271,662 | Rubissow | Feb. 3, 1942 |
| 2,380,111 | Kasten | July 10, 1945 |
| 2,421,704 | Kasten | June 3, 1947 |

FOREIGN PATENTS

| Number | Country | Date |
| --- | --- | --- |
| 9,228 | Great Britain | of 1911 |
| 523,919 | Great Britain | July 25, 1940 |